US008527758B2

(12) United States Patent
Mansour

(10) Patent No.: US 8,527,758 B2
(45) Date of Patent: Sep. 3, 2013

(54) SYSTEMS AND METHODS FOR FACILITATING USER IDENTITY VERIFICATION OVER A NETWORK

(75) Inventor: Rasta A Mansour, San Jose, CA (US)

(73) Assignee: Ebay Inc., San Jose, CA (US)

( * ) Notice: Subject to any disclaimer, the term of this patent is extended or adjusted under 35 U.S.C. 154(b) by 531 days.

(21) Appl. No.: 12/687,037

(22) Filed: Jan. 13, 2010

(65) Prior Publication Data

US 2011/0138176 A1    Jun. 9, 2011

Related U.S. Application Data

(60) Provisional application No. 61/285,115, filed on Dec. 9, 2009.

(51) Int. Cl.
*H04L 29/06* (2006.01)
(52) U.S. Cl.
USPC ............... 713/168; 380/28; 713/182; 726/2
(58) Field of Classification Search
None
See application file for complete search history.

(56) References Cited

U.S. PATENT DOCUMENTS

| 6,269,348 | B1 | 7/2001 | Pare, Jr. et al. | |
| 6,581,042 | B2 * | 6/2003 | Pare et al. ...................... | 705/40 |
| 7,512,567 | B2 * | 3/2009 | Bemmel et al. ................. | 705/67 |
| 2003/0191949 | A1 * | 10/2003 | Odagawa ...................... | 713/186 |
| 2005/0058288 | A1 * | 3/2005 | Sundaram et al. ............ | 380/258 |
| 2009/0063864 | A1 * | 3/2009 | Guillou .......................... | 713/176 |
| 2010/0180328 | A1 * | 7/2010 | Moas et al. ...................... | 726/6 |
| 2010/0235900 | A1 * | 9/2010 | Robinton et al. ................. | 726/9 |
| 2010/0290618 | A1 * | 11/2010 | Slawomir et al. .............. | 380/44 |
| 2011/0066670 | A1 * | 3/2011 | Yu .................................. | 708/252 |
| 2011/0138450 | A1 * | 6/2011 | Kesanupalli et al. ............. | 726/7 |
| 2011/0138454 | A1 * | 6/2011 | Mansour ........................... | 726/9 |
| 2011/0302420 | A1 * | 12/2011 | Davida ........................... | 713/180 |

OTHER PUBLICATIONS

Abhilasha Bhargav-Spantzel, Anna Squicciarini, and Elisa Bertino. 2006. Privacy preserving multi-factor authentication with biometrics. In Proceedings of the second ACM workshop on Digital identity management (DIM '06). ACM, New York, NY, USA, 63-72. DOI=10.1145/1179529.1179540  http://doi.acm.org/10.1145/1179529.1179540.*

* cited by examiner

*Primary Examiner* — Jeffery Williams
(74) *Attorney, Agent, or Firm* — Haynes and Boone LLP

(57) ABSTRACT

In accordance with embodiments of the present disclosure, systems and methods for facilitating network transactions including user identity verification over a network provide strong mutual authentication of client web application to server side application server, provide session encryption key negotiation after authentication to continue encryption during communication, and provide a high-level encryption technique referred to as an effective zero knowledge proof of identity (eZKPI) algorithm. In various implementations, the eZKPI algorithm is adapted to couple something the user Knows (e.g., a password) with something the user Has (e.g., a biometric signature) to create a stronger identity authentication proof for access to a mobile device and applications running on that device.

23 Claims, 8 Drawing Sheets

Equation of Line Passing through Two Points P and R $P(x_1, y_1)$:
$y_1 = Ax_1 + B$ $R(x_3, y_3)$:
$y_3 = Ax_3 + B$ $\Rightarrow \quad y_1 - y_3 = A(x_1 - x_3) \quad \Rightarrow \quad A = (y_1 - y_3)/(x_1 - x_3)$ $\Rightarrow \quad B = y_1 - x_1 * (y_1 - y_3)/(x_1 - x_3) \quad \Rightarrow \quad B = (x_1 y_3 - y_1 x_3)/(x_1 - x_3)$ Equation of Line passing through points P and R $Y = (y_1 - y_3)/(x_1 - x_3) X + (x_1 y_3 - y_1 x_3)/(x_1 - x_3)$ Equation of Line passing through points Q and T $Y = (y_2 - y_4)/(x_2 - x_4) X + (x_2 y_4 - y_2 x_4)/(x_2 - x_4)$

Fig. 2C

Equation for Calculating Intersection Point S, given Points P, Q, R, and T

P-R [Line through points $(x_1, y_1), (x_3, y_3)$]:
$Y = u_1 X + v_1, \quad u_1 = (y_1 - y_3)/(x_1 - x_3), \quad v_1 = (x_1 y_3 - y_1 x_3)/(x_1 - x_3)$

Q-T [Line through points $(x_2, y_2), (x_4, y_4)$]:
$Y = u_2 X + v_2, \quad u_2 = (y_2 - y_4)/(x_2 - x_4), \quad v_2 = (x_2 y_4 - y_2 x_4)/(x_2 - x_4)$

Intersection point S $(x_5, y_5)$:
$u_1 X + v_1 = u_2 X + v_2 \quad \Rightarrow \quad (u_1 - u_2) X = v_2 - v_1 \quad \Rightarrow \quad X = (v_2 - v_1)/(u_1 - u_2) = x_5$ $Y = u_1 (v_2 - v_1)/(u_1 - u_2) + v_1 \quad \Rightarrow \quad y = (u_1 v_2 - u_2 v_1)/(u_1 - u_2) = y_5$

Fig. 2D

Example of eZKPI with Values for Points P, Q, R, T, and S

Example:

P: (1, 5), Q: (4, 6), R: (4, 3), T: (1, 2)

Line P-R: $u_1=(5-3)/(1-4) = -2/3$, $v_1=(3-20)/(1-4) = 17/3$
$y = (-2/3)x + (17/3)$ ➔ $3y = 17 - 2x$ ➔ points P & R on this line

Line Q-T: $u_2=(6-2)/(4-1) = 4/3$, $v_2=(8-6)/(4-1) = 2/3$
$y = (4/3)x + (2/3)$ ➔ $3y = 4x + 2$ ➔ points Q & T on this line

Intersection point S $(x_S, y_S)$:
$x_S = (2/3 - 17/3) / (-2/3 - 4/3) = -15 / -6 = 5/2 = 2.5$
$y_S = (-4/9 - 68/9) / (2/3 - 4/3) = (-72/9) / (-6/3) = -8/-2 = 4$ point (2.5, 4) is on both line P-R and Q-T

Fig. 2E

SYSTEMS AND METHODS FOR FACILITATING USER IDENTITY VERIFICATION OVER A NETWORK

RELATED APPLICATIONS

This application claims priority to and benefit of Provisional Patent Application Ser. No. 61/285,115, entitled, "SYSTEMS AND METHODS FOR FACILITATING USER IDENTITY VERIFICATION OVER A NETWORK," filed Dec. 9, 2009, which is incorporated herein by reference in its entirety.

BACKGROUND

1. Technical Field

The present invention generally relates to network transactions and, more particularly, to facilitating user identity verification over a network.

2. Related Art

Mobile devices, such as cell phones, laptops, and tablet PCs, may be equipped with biometric devices to assist with user identity verification. These biometric devices may include fingerprint readers, voice analyzers, retina scanners, palm readers, and facial recognition devices. One purpose of adding biometric devices to mobile devices is to create higher confidence in verifying user identity when accessing the mobile device.

Typically, a username and password are assigned to a user of a mobile device as something that the user Knows. However, the assigned username and password may be easily compromised by a malicious intruder. In contrast, a biometric signature is something that the user Has and is more difficult to forge and present as proof of identity on behalf of a true owner of a mobile device. In many cases, what the user Has is superior and a stronger form of authentication information than what the user Knows.

In use of biometric information for user authentication to a device, the intent of the user is to obtain access to an operating system running on that device. For instance, referring to a cell phone device, the mobile biometric authentication may unlock the device so that the user is able to make a phone call. However, the end-user application running on that device may still require its own form of user authentication by asking the user to provide a username and password as proof of identity before accessing any applications. Many applications on mobile devices are in this category simply because their backend application is not able to accept biometric input, and instead, they utilize a traditional username and password sign-on process. In this instance, the authentication to the backend application accessed by the mobile device is a much weaker form of username and password authentication.

In some conventional mobile devices, for a user to access a device, what the user Has (e.g., fingerprint) has become the replacement for what the user Knows (e.g., password). To some extent, even though user experience for authentication to a device has been streamlined through the use of biometric authentication, the user merely provides a biometric signature (e.g., fingerprint scan), and if that passes, the user is authenticated, and access to the device is granted. Once access to the device is granted, the user still has to provide and authenticate a username and password to obtain access to applications on that device. These applications still depend on something the user Knows and may not benefit from what the user Has.

Accordingly, there exists a need to improve security for devices and network access when authenticating user identity by coupling what the user Has with what the user Knows in a more efficient and secure manner. In some instances, this may increase the confidence of authenticating user identity and inhibit illicit access to personal data and information.

SUMMARY

To overcome the deficiencies of using biometric signatures alone for authentication, embodiments of the present disclosure facilitate coupling of something the user Has (e.g., biometric information) with something the user Knows (e.g., password). By combing the two types of information in a unique manner, for example, through the use of a high-level encryption technique, referred to as an effective zero knowledge proof of identity (eZKPI) algorithm, the benefits increase for both types of information.

In accordance with embodiments of the present disclosure, the eZKPI algorithm uses a 2-factor authentication scheme for authenticating the user to applications on a device, such as a mobile communication device. One component of the 2-factor authentication scheme is based on user selected identification information (e.g., something the user Knows, such as a username and/or password), and another component of the 2-factor authentication scheme is based on biometric identification information related to the user (e.g., something the user Has, such as fingerprint information).

Accordingly, by combing something the user Has with something the user Knows, confidence in verifying user identity may increase as viewed from an end-user application perspective (e.g., eCommerce, Banking, and/or Social Networking application). Use of the eZKPI algorithm enables use of biometric-based authentication for remote applications that may not have the capability to interpret biometric input data form the user.

In accordance with embodiments of the present disclosure, systems and methods for facilitating transactions over a network, including user identity verification, provide strong mutual authentication of web-client application to server application server, provide high-level encryption with use of the eZKPI algorithm, and provide session encryption key negotiation after authentication to continue encryption during communication.

In accordance with embodiments of the present disclosure, systems and methods for facilitating transactions (e.g., user identity verification, user identity authentication, etc.) over a network include communicating with a user via a user device over the network, receiving an authentication request from the user via the user device over the network, and analyzing the authentication request to obtain user information and verify first (P) and second shared secret data (Q) related to the user. The systems and methods may include generating user challenge data (e.g., 3 random integers R, T, K), sending the user challenge data (R, T, K) to the user via the user device over the network, defining one or more relationships (PR, QT) between the first shared secret data (P), the second shared secret data (Q), and the user challenge data (R, T, K), and determining intersection data (S) for the one or more relationships (PR, QT). The systems and methods may include calculating first user hash data (e.g., user hash value H(H(K+S))) from the user challenge data (K) and the intersection data (S), receiving second user hash data (e.g., user hash value H(H (K+S))) from the user via the user device over the network, and comparing the first user hash data with the second user hash data to authenticate user identity. In one aspect, if user identity is authenticated, then the systems and methods continue communicating with the user via the user device over the network, and if user identity is not authenticated, then the systems and methods abort communicating with the user via the user device over the network.

In various implementations, the authentication request may include information related to the user including at least one of a username, first shared secret data, and second shared secret data. Verifying the first (P) and second shared secret data (Q) of the user may include locating a user account related to the user based on the user information passed with the authentication request, and comparing the user information of the authentication request with user information of the user account to verify first (P) and second shared secret data (Q) related to the user. The user account may include information related to the user including at least one of username, first shared secret data, and second shared secret data.

In various implementations, the first shared secret data may include biometric identification data represented by a first integer value P, and the biometric identification data may include at least one of fingerprint reader data, voice analyzer data, retina scanner data, palm reader data, and a facial recognition data. The second shared secret data may include user selected identification data represented by a second integer value Q, and the user selected identification data may include a user selected username and/or password.

In various implementations, the user challenge data (R, T, K) may include a plurality of data components including a plurality of different random integer values, wherein each random integer value comprises 10 to 20 digits, and wherein a first data component may include a first integer value T, a second data component may include a second integer value R, and a third data component may include a third integer value K. Defining one or more relationships may include defining a first line segment (PR) from the first shared secret data (P) and a first data component of the user challenge data (R), and defining a second line segment (QT) from the second shared secret data (Q) and a second data component of the user challenge data (T). The first line segment (PR) passes through point values for the first shared secret data (P) and the first data component of the user challenge data (R), and the second line segment (QT) passes through point values for the second shared secret data (Q) and the second data component of the user challenge data (T). Determining intersection data (S) for the one or more relationships (PR, QT) may include determining an intersection point (S) of the first and second line segments (PR, QT).

In various implementations, the first user hash data (e.g., user hash value H(H(K+S))) may include a hash value calculated from a third data component of the user challenge data (K) and the intersection data (S). Receiving the second user hash data (e.g., user hash value H(H(K+S))) may include receiving a hash value calculated by the user via the user device from a third data component of the user challenge data (K) and the intersection data (S) from the user via the user device over the network. Comparing the first user hash data with the second user hash data to authenticate user identity may include determining if the first user hash data matches the second user hash data.

In various implementations, the systems and methods may include storing a first encryption value (K+S) having a third component of the user challenge data (K) and the intersection data (S), and storing a second encryption value (L+S+K) having the server challenge data, the intersection data (S), and the third component of the user challenge data (K). The server challenge data (L) may include a random integer value (L) having 10 to 20 digits, and the systems and methods may include receiving server challenge data (L) with the second user hash data from the user via the user device over the network.

In various implementations, the systems and methods may include calculating first server hash data (e.g., server hash value H(H(L+S+K))) from the server challenge data (L), the intersection data (S), and a third component of the user challenge data (K), and sending the first server hash data to the user via the user device over the network so that the user via the user device receives the first server hash data, calculates second server hash data (e.g., server hash value H(H(L+S+K))) from the server challenge data (L), the intersection data (S), and the third component of the user challenge data (K), and compares the first server hash data with the second server hash data to authenticate server identity of the server. In one aspect, if server identity is authenticated, then the user via the user device continues communicating with the server, and if server identity is not authenticated, then the user via the user device aborts communicating with the server.

These and other features and advantages of the present disclosure will be more readily apparent from the detailed description of the embodiments set forth below taken in conjunction with the accompanying drawings.

BRIEF DESCRIPTION OF THE DRAWINGS

FIG. 2C shows a mathematical foundation for the eZKPI algorithm, in accordance with embodiments of the present disclosure.

FIG. 2D shows equations for calculating values for the eZKPI algorithm, in accordance with embodiments of the present disclosure.

FIG. 2E shows a computational example of the eZKPI algorithm, in accordance with embodiments of the present disclosure.

Figure 1:
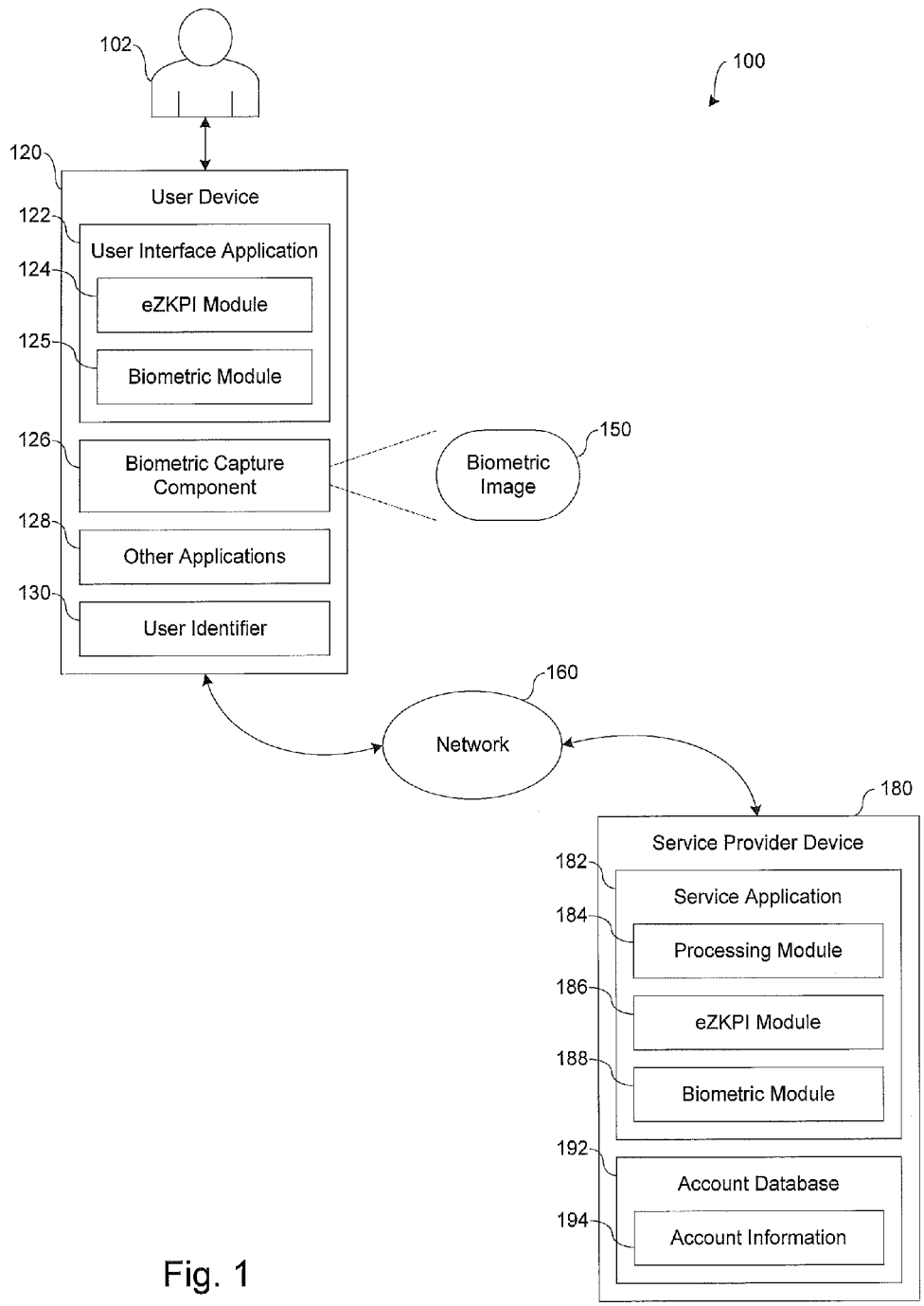
FIG. 1 shows a block diagram of a system adapted to facilitate network transactions over a network, in accordance with embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure relate to facilitating network transactions and user identity verification over a network. In one implementation, embodiments of the present disclosure provide strong mutual authentication of client web application to server side application server, and vice versa. In another implementation, embodiments of the present disclosure provide session encryption key negotiation after authentication to continue encryption during the remainder of communication.

Embodiments of the present disclosure provide a high-level encryption technique, referred to as an effective zero knowledge proof of identity (eZKPI) algorithm.

FIG. 1 shows one embodiment of a block diagram of a system 100 adapted to facilitate network transactions, including user identity verification, over a network 160. As shown in FIG. 1, the system 100 includes at least one user device 120 (e.g., network communication device, such as a mobile phone) and at least one service provider device 180 (e.g., network communication device, such as a server) in communication over the network 160.

The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user device 120 and service provider device 180 may be associated with a particular network link (e.g., a link, such as a URL (Uniform Resource Locator) to an IP (Internet Protocol) address) and/or or a mobile phone number.

The user device 120, in various embodiments, may be implemented utilizing any appropriate combination of hardware and/or software configured for wired and/or wireless communication over the network 160. In one embodiment, the user device 120 may be implemented as a mobile communication device (e.g., mobile phone) and/or various other generally known types of wireless communication devices adapted for communication with the network 160. In various other embodiments, the user device 120 may be implemented as a personal computer (PC), a personal digital assistant (PDA), a notebook computer, and/or various other generally known types of wired and/or wireless computing devices for communication with the network 160. It should be appreciated by those skilled in the art that the user device 120 may be referred to as a client device or a customer device without departing from the scope of the present disclosure.

The user device 120, in one embodiment, includes a user interface application 122, which may be utilized by a user 102 to conduct network transactions including electronic commerce and user identity verification with the service provider device 180 over the network 160. For example, the user interface application 122 may be implemented as an listing application to create, list, store, track, and manage information related to items, products, and/or services proffered for sale over the network 160. In another example, the user interface application 122 utilizes an eZKPI module 124 and a biometric module 125 adapted to assist the user 102 with user authentication and identity verification with the service provider device 180 over the network 160. These and other aspects of the present disclosure are described in greater detail herein.

In one implementation, the user interface application 122 comprises a software program, such as a graphical user interface (GUI), executable by a processor that is configured to interface and communicate with the service provider device 180 via the network 160. In another implementation, the user interface application 122 comprises a network browser module that provides a network interface to browse information available over the network 160. For example, the user interface application 122 may be implemented, in part, as a web browser to view information available over the network 160. In another example, the user 102 is able to access the service provider device 180 to conduct electronic commerce and verify user identity via the network 160. As such, the user 102 may conduct various types of network transactions, including user identity verification and electronic commerce, with the service provider device 180 over the network 160.

The user interface application 122, in one embodiment, utilizes the eZKPI module 124 and the biometric module 125 to authenticate user identity with the service provider device 180 over the network 160. In one implementation, the eZKPI module 124 is adapted to assist with processing of the eZKPI algorithm for authentication and verification of user identity. In one aspect, the eZKPI module 124 is adapted to utilize the eZKPI algorithm for encryption of user data and information for transfer to the service provider device 180 over the network 160. In another implementation, the biometric module 125 is adapted to assist with processing of user related biometric data and information for authentication and verification of user identity. In one aspect, the eZKPI module 124 is adapted to utilize the eZKPI algorithm and the biometric module 125 for encryption of user biometric data and information for transfer to the service provider device 180 over the network 160. These and other aspects of the present disclosure are described in greater detail herein.

The user device 120, in one embodiment, may include a biometric capture component 126 (e.g., fingerprint reader, voice analyzer, retina scanner, palm reader, and/or facial recognition device) adapted to interface with the user interface application 122, the eZKPI module 124, and the biometric module 125 to capture, store, analyze, and utilize one or more biometric images, such as biometric image 150. The biometric capture component 126 may represent any type of biometric imaging device, which for example detects visible light and provides representative biometric data (e.g., one or more biometric images). The biometric capture component 126 may comprise a portable biometric imaging device that is adapted to be incorporated into the user device 120 (e.g., a mobile communication device, such as a mobile phone). In one aspect, the user device 120 operates as a mobile phone comprising the biometric capture component 126 in communication with the network 160, which is adapted to provide biometric identification data and information related to the user directly from the user device 120.

The biometric capture component 126 comprises, in various embodiments, visible light sensors for capturing biometric image signals representative of a biometric image, such as biometric image 150. In one example, visible light sensors of biometric capture component 126 provide for representing (e.g., converting) captured biometric image signals as digital data and/or information. The biometric capture component 126 may comprise, in various embodiments, audio sensors along with visible light sensors for capturing biometric audio and/or image signals. A such, in another example, audio sensors and/or visible light sensors of the biometric capture component 126 provide for representing (e.g., converting) captured biometric audio and/or image signals as digital data and/or information. As such, it should be appreciated that biometric image 150 may comprise any type of biometric image including a biometric image representing a fingerprint, voice, retina, palm, face, etc.

In one implementation, the user device 120 may comprise a processing component adapted to convert captured biometric image signals into biometric data and information, store biometric data and information in a memory component, and retrieve stored biometric data and information from the memory component. The processing component is adapted to process biometric data and information stored in the memory component, and the biometric data and information may include captured biometric image data and information and/or processed biometric image data and information.

The user device 120, in various embodiments, may include other applications 128 as may be desired in one or more embodiments of the present disclosure to provide additional features available to the user 102. In one example, such other applications 128 may include security applications for implementing client-side security features, programmatic client applications for interfacing with appropriate application programming interfaces (APIs) over the network 160, and/or various other types of generally known programs and/or software applications. In still other examples, one or more of the other applications 128 may interface with the user interface application 122, the eZKPI module 124, and the biometric module 125 for improved security.

The user device 120, in one embodiment, may include at least one user identifier 130, which may be implemented, e.g., as identity attributes, operating system registry entries, cookies associated with the user interface application 122, identifiers associated with hardware of the user device 120, and/or various other appropriate identifiers. The user identifier 130 may include one or more attributes related to the user 102, such as personal information related to the user 102 (e.g., one or more usernames, passwords, addresses, phone numbers, etc.), biometric information related to the user 102 (e.g., biometric identification data including fingerprint data, voice analysis data, retina data, palm data, and/or facial recognition data), and/or account information related to the user 102 (e.g., banking institutions, credit card issuers, user account numbers, security data, etc.). In various aspects, the user identifier 130 may be passed with a login request and/or an authentication request to the service provider device 180 via the network 160, and the user identifier 130 may be used by the service provider device 180 to associate the user 102 with a particular user account maintained by the service provider device 180.

The service provider device 180, in various embodiments, may be maintained by a network based electronic commerce entity adapted to process network transactions, financial transactions, and/or information transactions on behalf of the user 102 via the user device 120 over the network 160. In one implementation, the service provider device 180 includes a service application 182 adapted to interact with the user device 120 over the network 160 to process network transactions, including verifying user identity and facilitating electronic commerce. In one embodiment, the service provider device 180 may be provided by PayPal, Inc. and/or eBay of San Jose, Calif., USA.

The service application 182, in one embodiment, is adapted to utilize a processing module 184 to process network transactions including user identity verification, purchases, and/or payments for financial transactions between network users including user 102 and, in some examples, merchants. In one implementation, the processing module 184 working in conjunction with an eZKPI module 186 and a biometric module 188 assists with resolving user identity verification. In another implementation, the processing module 184 assists with resolving financial transactions through validation, delivery, and settlement. Accordingly, the service application 182 in conjunction with the processing module 184, the eZKPI module 186, and the biometric module 188 is adapted to settle indebtedness between users including user 102 and, in some examples, merchants, wherein user accounts may be directly and/or automatically debited and/or credited of monetary funds in a manner as accepted by the banking industry.

The service application 182, in one embodiment, utilizes the eZKPI module 186 and the biometric module 188 to authenticate user identity with the user 102 via the user device 120 over the network 160. In one implementation, the eZKPI module 186 is adapted to assist the processing module 184 with processing of the eZKPI algorithm for authentication and verification of user identity. In one aspect, the eZKPI module 186 is adapted to utilize the eZKPI algorithm for decryption of user data and information received from the user 102 via the user device 120 over the network 160. In another implementation, the biometric module 188 is adapted to assist the processing module 184 with processing of user related biometric data and information for user authentication and verification of identity. In one aspect, the eZKPI module 186 is adapted to utilize the eZKPI algorithm and the biometric module 186 for decryption of user biometric data and information received from the user 102 via the user device 120 over the network 160. These and other aspects of the present disclosure are described in greater detail herein.

The service provider device 180, in one embodiment, may be configured to maintain one or more user accounts and, in some examples, merchant accounts in an account database 192, wherein each account may include account information 194 associated with one or more individual users (e.g., user 102) and/or merchants. For example, account information 194 may include private financial information of the user 102 or merchant, such as one or more account numbers, passwords, credit card information, banking information, or other types of financial information, which may be used to facilitate electronic commerce transactions between users, including the user 102 and/or merchants. In various implementations, the methods and systems described herein may be modified to accommodate one or more users and/or merchants that may or may not be associated with at least one existing account. As such, the service application 182, in various implementations, is adapted to utilize the eZKPI module 186 and the biometric module 188 to verify user identity over the network 160 for account access. These and other aspects related to the eZKPI module 186 and the biometric module 188 are described in greater detail herein.

In one implementation, the user 102 may have identity attributes stored with the service provider device 180 in the account database 192 as part of a user account, and the user 102 may have credentials to authenticate or verify identity with the service provider device 180. In various aspects, user attributes may include personal information (e.g., username and password), biometric information (e.g., biometric identification information), and/or banking information (e.g., user account number). In various other aspects, the user attributes may be passed to the service provider device 180 as part of a login request, authentication request, and/or some other related request, and the user attributes may be utilized by the service provider device 180 to associate the user 102 with one or more particular user accounts maintained by the service provider device 180.

Figure 2A:
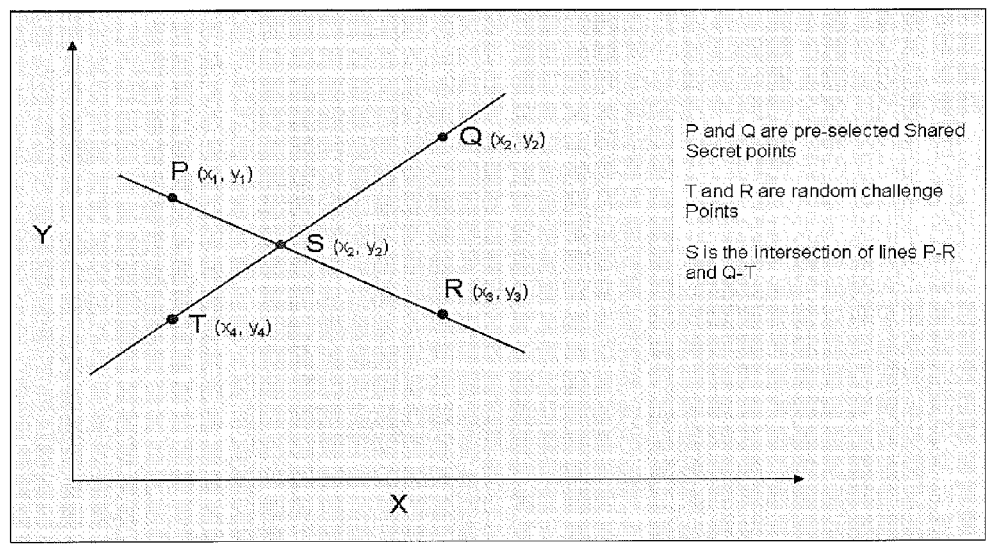
FIG. 2A shows a relationship of lines and points in two-dimensional (2D) Euclidean Geometry, in accordance with embodiments of the present disclosure.

FIG. 2A shows a relationship of lines and points in two-dimensional (2D) Euclidean Geometry, in accordance with embodiments of the present disclosure.

In one embodiment, the eZKPI algorithm is based on properties of lines and points in two-dimensional (2D) Euclidean geometry. In reference to Euclidean geometry and based on the parallel postulate or 5th axiom, any line that is not parallel to another line intersects it at exactly one point. Moreover, given two points on a two-dimensional space (e.g., P and R, as shown in FIG. 1), the equation of the line passing through those points is $Y=AX+B$, where X and Y are the variables, and A and B are the chosen constants based on the two points.

In one aspect, the eZKPI algorithm uses the properties of lines and point in Euclidean geometry, along with a particular zero knowledge protocol to implement an effective zero knowledge proof of identity (eZKPI) algorithm to overcome the deficiencies of conventional password authentication.

Figure 2B:
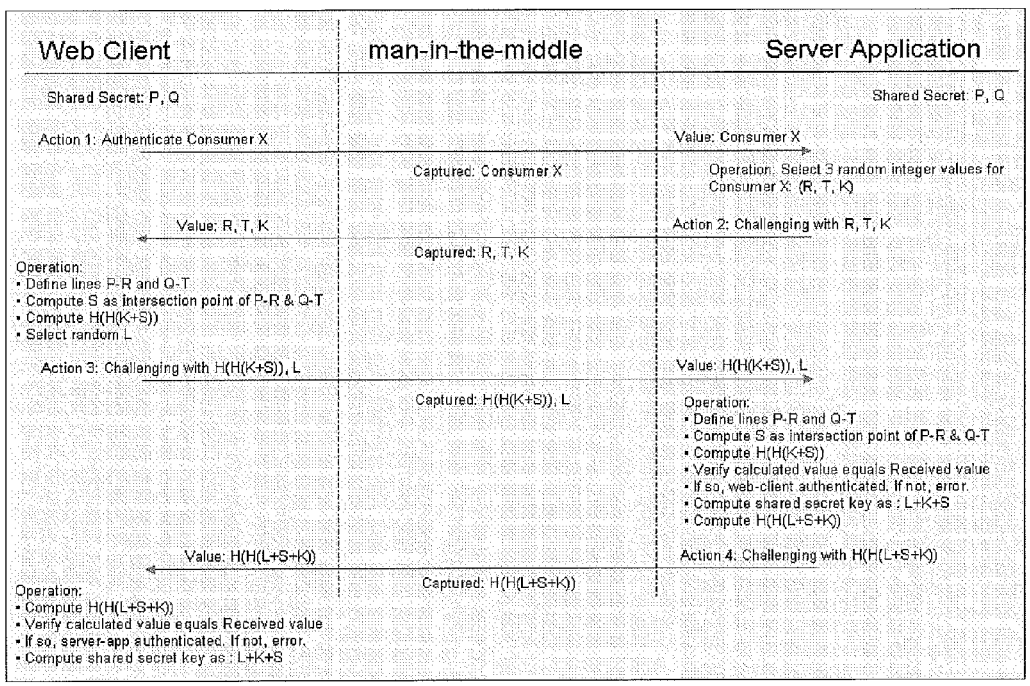
FIG. 2B shows a process flow diagram of an eZKPI algorithm, in accordance with embodiments of the present disclosure.

FIG. 2B shows one embodiment of the eZKPI algorithm as a sequence diagram. In reference to FIG. 1, points P and Q may be considered shared secrets between a web-client (e.g., user service application 122) and a server application (e.g., service application 182). Choosing P and Q as a shared secret is discussed in greater detail herein. Points P, Q, R, T, are considered logical points. The logical to physical conversion of points P, Q, R, T, and S is discussed in greater detail herein.

As shown in FIG. 2B, the eZKPI algorithm is provided as follows, in accordance with an embodiment of the present disclosure.

1. A web-client (e.g., user service application 122) initiates a conversation to a server application (e.g., service application 182) by sending a request for authentication. In that authentication request, the web-client (e.g., user service application 122) sends one or more references to identity (e.g., Consumer X).

2. During the entire protocol, which may be run over Http only, it may be assumed that there is an eavesdropper or man-in-the-middle in conversation between the web-client (e.g., user service application 122) and the server application (e.g., service application 182). This is the core and strength of zero knowledge proof of identity, wherein the middle-man gains nothing from eavesdropping or proxying the request.

3. The server application (e.g., service application 182) receives the authentication request, verifies that it has a shared secret with Consumer X, and then to challenge, the web-client (e.g., user service application 122) generates one or more random integer values (e.g., 3 random integer values) of order 10 to 20 digits each. In one aspect, two of the random values represent points T and R, wherein the web-client (e.g., user service application 122) calculates the line intersection thereof. The value K is a random value to seed all subsequent hash functions and also takes part in the final negotiated encryption key. Since T, R, and K are all random and are all different per authentication request (in one aspect, only the combination of all 3 random integers is unique, and any subset may be repeated, which does not weaken the algorithm), each intersection S, or data sent over the network, is different. This means no record and replay of this data is possible by the eavesdropper or man-in-the-middle.

4. The web-client (e.g., user service application 122) receives the 3 values R, T, and K. The web-client (e.g., user service application 122) then defines line segment PR passing through points PR, and line segment QT, using shared secret values of P and Q. Further discussion for how this done is described in greater detail herein. The web-client (e.g., user service application 122) computes the intersection of lines PR and QT, and the intersection point is S.

5. Next, the value H(H(K+S)) is computed. The Hash function is a cryptographically secure one-way message digest function like: SHA-2. However, since this is a Hash of a Hash, even less secure message digests like MD5 and SHA-1 may be used. In one aspect, Hash of Hash, itself, is a strong (secure) message digest function. In another aspect, the "+" operator connotes concatenation. The value computed in this step is K left concatenated to S and Hash of Hash of that value obtained.

6. Next, a random integer value L of order of 10 to 20 digits may be selected by the client. The random value L is selected to challenge the server application (e.g., service application 182) to authenticate itself. Since a new random value is used per authentication request, this may eliminate any replay of data by the server or the man-in-the-middle to the web-client (e.g., user service application 122). In one aspect, the value of L may be repeated across authentication protocols, as long as combination of R, T, K, and L is unique.

7. The server application (e.g., service application 182) is then presented with values: H(H(K+S)) and L.

8. The server application (e.g., service application 182) may use the same action as #4 and #5 above to compute the same H(H(K+S)) using the shared secret values. It then compares its value with the received value. If the two match, the web-client (e.g., user service application 122) is authenticated. If not, this is an authentication error and the protocol may be aborted.

9. Once the web-client (e.g., user service application 122) is authenticated, the server application (e.g., service application 182) needs to authenticate itself. In one implementation, the server application (e.g., service application 182) computes H(H(L+S+K)) and returns the computation to web-client (e.g., user service application 122) for validation. In one aspect, the random value L may be used in this context to make the hash unique for each authentication request.

10. The server application (e.g., service application 182) stores the values L+K+S as the negotiated shared secret for subsequent encryption. In one aspect, the hash of this value may be used as the shared encryption key.

11. The web-client (e.g., user service application 122) receives the value H(H(L+S+K)) and computes an equivalent value. If the two values match, the server is authenticated. If not, this is an error, and the authentication protocol may be aborted.

12. In one implementation, same as server application (e.g., service application 182), the value L+K+S is used as the common, negotiated encryption key for subsequent data exchange between the web-client (e.g., user service application 122) and the server application (e.g., service application 182).

Referring to FIG. 2B, the eZKPI algorithm provides the following benefits, according to embodiments of the present disclosure.

No Https or use of X.509 certificates are needed. In one aspect, only Http throughout the authentication protocol is used. All data over the network may be assumed to have been captured by a man-in-the-middle with no consequence. Mutual, strong authentication for both the web-client (e.g., user service application 122) and the server application (e.g., service application 182) is utilized. Negotiated encryption key for subsequent encrypted data exchanges is utilized. Each authentication request is unique in both directions given random values for T, R, K, and L. The authentication process is highly secure, with zero knowledge about shared secrets leaking out.

Comparable computational effort, if not less, for using this protocol versus sending a hashed password over Https session. Https setup is quite computationally expensive due to digital signature validation and certificate-chain validation of X.509 certificates. Also, each data transfer has to be encrypted to keep it protected. No encryption, or certificate-chain validation, is needed in this protocol.

No weak passwords, as all shared secret points are numbers that have no direct affinity to common information, such as user's child's name, pet name, etc. At 12 digits for each shared secret logical point value, total of $10^{12}*10^{12}$ or roughly $2^3{^{12}}*2^3{^{12}}$ or about $2^{72}$ logical points are possible. This is larger than the key space of 6 character passwords with roughly 70 characters in the mix (e.g., upper/lower alpha, plus digits, plus up to 8 punctuation characters, or $70^6$ or roughly $2^7{^6}$ or $2^{42}$). In one aspect, conversion of pass-phrases to 12 digit values and translation of logical point values to physical (x, y) coordinates is described in greater detail herein.

FIG. 2C shows a mathematical foundation for the eZKPI algorithm, in accordance with embodiments of the present disclosure. In one aspect, FIG. 2C demonstrates a process for calculating an equation for a line passing through two given points, such as P and R.

As shown in FIG. 2C, given point P with its physical coordinate values of X1 and Y1, and point R with its coordinates of X3 and Y3, the equation of the line is Y=AX+B, where A and B are as calculated and shown in FIG. 2C. In one aspect, the equations for line-segments PR and QT are shown in FIG. 2C.

FIG. 2D shows equations for calculating intersection point S of line segments PR and QT, in accordance with embodiments of the present disclosure. The two coordinates for the computation (x5 and y5) may be calculated in terms of coordinates X1 through X4, and Y1 through Y4 of 4 points P, Q, R, and T.

FIG. 2E shows a computational example of the eZKPI algorithm with values for P, Q, R, T, and S points. As shown in FIG. 2E, the equation of line PR may be first computed using the equations from FIG. 2D. Then, the equation of line QT may be computed, and the intersection point of lines PR and QT may be computed using the equations of FIG. 2D. In one aspect, intersection point S is on both lines PR and QT. Per Euclidean geometry, there may be only one such intersection point for the two lines PR and QT.

In one aspect, shared secrets P and Q may be selected out-of-band. During web-user registration process, the server application (e.g., the service application 182) is adapted to ask the web user (e.g., user 102) to select at least one of the three ways of selecting logical values for P and Q, as follows.

For example, selecting logical values for P and Q may involve selecting two 10 to 20 digit numbers for P and Q, such as, for example, 235798014211, 8956091234.

In another example, selecting logical values for P and Q may involve selecting a 12 character, or longer, pass phrase, such as "today is a nice day." In one aspect, punctuation including white spaces and mixed case may be ignored for pass phrases. This is one reason why the length needs to be longer than usual password length. This pass phrase approach allows the user to provide an easily remembered pass phrase that is less likely to be vulnerable to dictionary attack, as would be the case for a weak password. If this mode is selected, the pass phrase is hashed to a 256-bit value (32 bytes). Ignoring the top 4 bytes, and the bottom 4 bytes, the remaining middle 24 bytes are split in 2 halves, wherein the top half is used for point P, and the bottom half is used for point Q. Each byte of the top or bottom half is processed modulo 10 to give a digit in range 0 to 9. In one aspect, P and Q are 12 digits each in this scenario.

In another example, this may involve selecting a password of at least 8 characters in length that is composed of mixed case alpha characters, punctuation, and numbers. If this mode is selected, the password is hashed to a 256-bit value (32 bytes). Ignoring the top 4 bytes, and the bottom 4 bytes, the remaining middle 24 bytes are split in 2 halves, wherein the top half is used for point P, and the bottom half is used for point Q. Each byte of the top or bottom half is processed modulo 10 to give a digit in range 0 to 9. In one aspect, P and Q are 12 digits each in this scenario.

Regardless of which method is used by the web-client user (e.g., user 102), a 10 to 20 digit logical value for points P and Q is derived and used as a shared secret between the web-client (e.g., user interface application 122) and the server application (e.g., service application 182).

The following discusses the process of translating a logical value to coordinate system values for computation of an equation of a line. In one aspect, it may be up to the implementation of web-client (e.g., user service application 122) or server application (e.g., service application 182) to decide whether to store P and Q as logical values and convert them to coordinate system values as needed or to store them as coordinate values from the start.

The following discusses conversion of logical values to (x, y) coordinates. In one aspect, logical value in this case refers to a 10 to 20 digit integer value. However, as shown in FIGS. 2C and 2D, to compute the equation of the line for lines PR or QT, or to compute the intersection point S, one needs to be working with coordinate system values of P and Q (e.g., x and y coordinates). There are many ways logical values may be translated to coordinate values. Two practical ways are described as follows.

In one example, for a given 10 to 20 digit logical value, e.g., the value for point P, split the value in half and use the top half for an X coordinate and the bottom half for a Y coordinate.

In another example, a 256 bit (32 byte) Hash value of any logical value, e.g., point P, is computed. The middle 5 bits of each byte (bits 2 through 6) are used to form a 160-bit or 20 byte number. The top 10 bytes of this 20 byte number is an X coordinate. The bottom 10 bytes is a Y coordinate. Each byte is processed modulo 10 to give a digit in the range 0 to 9.

In one aspect, referring to the eZKPI algorithm, there may not be a need for reverse conversion from coordinate format back to logical format. Even when the intersection point S is computed in coordinate format, the H(H(K+S)) or any similar hash function involving S, is actually based on concatenation of physical coordinates of S (e.g., x5 and y5) and not the logical value of S. This provides many ways for converting logical values to coordinate values, as the conversion process does not need to be reversible.

In accordance with embodiments of the present disclosure, the eZKPI algorithm is unique and novel, and the formulation of the eZKPI algorithm and the application of the eZKPI algorithm to the problem of web-based authentication is also unique and novel.

The eZKPI/biometric based user authentication utilizes the eZKPI algorithm to combine something the user Has (e.g., biometric identification information) with something the user Knows (e.g., user selected identification information). The eZKPI/biometric based user authentication creates a seamless strong authentication scheme for both authenticating to the device, as well as, authenticating to the application running on that device. In one aspect, the eZKPI algorithm is utilized to couple device authentication to application authentication.

As described herein, the biometric device (e.g., biometric capture component 126) may include a fingerprint reader, a voice analyzer, a retina scanner, a palm reader, and/or a facial recognition device. In all cases, the objective of adding a biometric device to the mobile device (e.g., user device 120, such as a mobile phone) is to create higher confidence in verifying user identity when a user (e.g., user 102) accesses the mobile device. Each one of these biometric authentication schemes produces two effects. One effect is the data that is captured by the biometric scanner to validate identity, which may be referred to as Input Data or I_D. The other effect is the action produced by the Input Data, which may be referred to as Verification of Identity or V_I.

In one implementation of the eZKPI algorithm, the user 102 may select two points P and Q. For the coupling of what the user Has to what the user Knows, let P=F(I_D) and Q=F (V_I). For example point P may be selected as some function of Input Biometric Data (e.g., fingerprint data), and point Q may be selected by the user 102, as something the user 102

Knows, such as Input User Selected Data (e.g., a password). In one aspect, both P and Q are selected through an out-of-band user registration process. During a registration process, the user 102 may be asked to participate in a biometric authentication process. The Input Data collected from the biometric authentication process is converted to point P and shared with a remote server application (e.g., service application 182) as a shared secret. The user selects point Q as user selected identification information.

Once points P and Q are selected, the eZKPI authentication scheme is challenged with two random points R and T for computing intersection point of S of lines PR and QT, as described herein, in reference to the eZKPI algorithm. Point Q is obtained from the user 102 as something they Know. Point P is obtained from the mobile device by asking for Input Data from last time the user authenticated itself to the device; or if needed, the user is asked to re-authenticate their biometric data (e.g., scan their fingerprint again). In one aspect, once points P and Q are known, the eZKPI algorithm is adapted to proceed with calculation of intersection point S and provide zero knowledge proof of identity (eZKPI) of the intersection point S to the other party.

In one implementation, point P may be calculated as Hash of raw input data from biometric scan. For instance, when a fingerprint scan is captured through an optical or a CCD (charged coupled device) scanner, a complex algorithm is used to look at patterns of how some ridge lines end or are split into multiple lines. These are called minutiae and typical patterns. This raw data, or some unique subset of it, if provided to the eZKPI algorithm may be run through a one-way hash function, like SHA-2 (Secure Hash Algorithm version 2, 256 bits) to create a value for point P. It should be appreciated by those skilled in the art that any cryptographically strong one-way hash function may be utilized, without departing from the scope of the present disclosure.

In one aspect, the cryptographic strength of eZKPI algorithm, as discussed herein, may remain unchanged through use of this application. For example, having point P directly dependent on something the user Has reduces the likelihood that both what the user Knows (point Q) and what the user Has (point P) may be compromised at the same time.

If the device is lost or stolen, access to the device or to the applications running on that device is protected because the biometric signature of the device owner may not be replicated. If what the user has (point Q) is compromised, again that information alone may not be used to successfully access the device or the application on that device because the biometric data (point P) is missing from eZKPI algorithm.

Since the user is only asked to input point Q, and point P is derived from biometric scan, a go-around path does not exist for applications which deploy this algorithm. That is, one cannot phish for point Q and try to authenticate to remote backend application via that information alone. Similarly, if the fingerprint of the user is somehow captured and replied back to the fingerprint scanner, the knowledge of P is compromised, but the knowledge of Q is still with the user. Accordingly, the eZKPI algorithm is a strong 2-factor authentication scheme with several natural controls against information compromise.

From the perspective of end-user remote application (e.g., a Banking or eCommerce application), not only the user is authenticated by correctly running through eZKPI proof of identity, but also the device from which the request is coming from is authenticated, if the biometric device, as part of its Input Data also includes a unique device ID (e.g., a Serial # or a GUID—Globally Unique Identifier). The remote application has a higher confidence in the identity of the user because both what the user knows (point Q) and what the user has (point P via biometric scan) are used to authenticate the user. In accordance with embodiments of thee present disclosure, remote backend applications, which have no knowledge of biometric input data, may accept indirect biometric based data and strongly authenticate user identity via the eZKPI/biometric based user authentication utilizing the eZKPI algorithm.

Figure 3A:
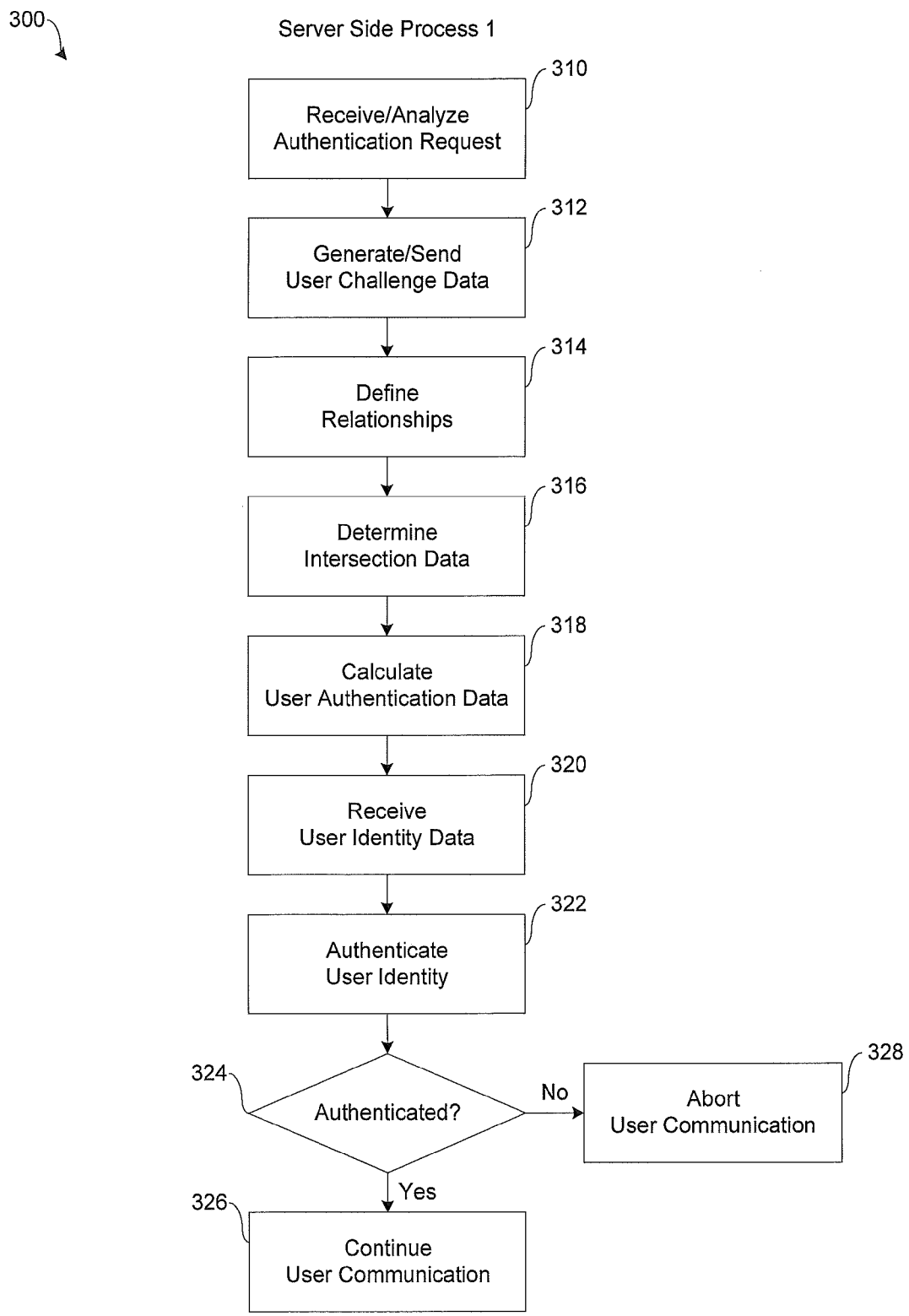
FIGS. 3A and 3B show various methods for facilitating network transactions including user identity verification, in accordance with embodiments of the present disclosure.

FIG. 3A shows one embodiment of a method 300 of a server-side process for facilitating network transactions over the network 160 including user identity verification. For purposes of explanation, the method 300 of FIG. 3A is discussed in reference to FIG. 1, but should not be limited thereto.

In one implementation, the service provider device 180 is adapted to receive and analyze an authentication request from the user 102 (block 310). For example, the service provider device 180 is adapted to communicate with the user 102 via the user device 120 over the network 160, receive an authentication request from the user 102 via the user device 120 over the network 160, and analyze the authentication request to obtain user information and verify first shared secret data (P) and second shared secret data (Q) related to the user.

In one aspect, a web-client (e.g., user interface application 122) initiates communication with a network server application (e.g., service application 182 of service provider device 180) by sending a request for authentication. In that authentication request, the web-client sends one or more references to identity (e.g., a username, first shared secret data P, and/or second shared secret data Q). The first shared secret data may comprise biometric identification data represented by a first integer value P. The biometric identification data may comprise at least one of fingerprint reader data, voice analyzer data, retina scanner data, palm reader data, and a facial recognition data. The second shared secret data may comprise user selected identification data represented by a second integer value Q. The user selected identification data may comprise a user selected password.

In another aspect, the service provider device 180 may be adapted to verify the first shared secret (P) and the second shared secret data (Q) of the user 102 by locating a user account in the account database 192 related to the user 102 based on user information passed with the authentication request, compare the user information of the authentication request with user information of the user account to verify the first shared secret data (P) and the second shared secret data (Q) related to the user. The user account may include information related to the user including at least one of username, the first shared secret data, and the second shared secret data.

Next, the service provider device 180 is adapted to generate and send user challenge data to the user 102 (block 312). For example, the service provider device 180 is adapted to generate user challenge data (e.g., 3 random integers R, T, K), and send the user challenge data (R, T, K) to the user 102 via the user device 120 over the network 160.

In one aspect, the user challenge data (R, T, K) may comprise a plurality of data components including a plurality of different random integer values. Each random integer value may comprise 10 to 20 digits. A first data component may comprise a first integer value T, a second data component may comprise a second integer value R, and a third data component may comprise a third integer value K.

In another aspect, the server application (e.g., service application 182 of service provider device 180) is adapted to receive the authentication request, verify that it has a shared secret with the user (e.g., user interface application 122), and then challenges the user by generating one or more random integer values (e.g., 3 random integer values: R, T, K) of order 10 to 20 digits each. Two of the random values represent points R and T from FIG. 2A. The value K is a random value that may seed all subsequent hash functions and takes part in negotiated encryption keys. Since T, R, and K are random and are different per authentication request, each intersection S is different. In one aspect, the combination of all 3 random integers is unique, and any subset may be repeated, which does not weaken the algorithm.

Next, the service provider device 180 is adapted to define one or more relationships (PR, QT) between the first shared secret data (P), the second shared secret data (Q), and the user challenge data (R, T, K) (block 314). For example, referring to FIG. 2A, defining one or more relationships may comprise defining a first line segment (PR) from the first shared secret data (P) and a first data component of the user challenge data (R) and defining a second line segment (QT) from the second shared secret data (Q) and a second data component of the user challenge data (T). The first line segment (PR) may pass through point values for the first shared secret data (P) and the first data component of the user challenge data (R), and the second line segment (QT) may pass through point values for the second shared secret data (Q) and the second data component of the user challenge data (T).

Next, the service provider device 180 is adapted to determine intersection data (S) for the one or more relationships (PR, QT) (block 316). For example, referring to FIG. 2A, determining intersection data (S) for the one or more relationships (PR, QT) may comprise determining an intersection point (S) of the first and second line segments (PR, QT).

In one aspect, the web-client (e.g., user interface application 122) receives the 3 values R, T, and K from the service provider device 180 over the network 160. The user interface application 122 of the user device 120 is adapted to define line segment PR passing through points P and R, and line segment QT passing through points Q and T, using shared secret values of P and Q. The user interface application 122 of the user device 120 is adapted to compute the intersection of lines PR and QT at the intersection point S.

Next, the service provider device 180 is adapted to calculate user authentication data (block 318). For example, the service provider device 180 is adapted to calculate the user authentication data as first user hash data (e.g., user hash value H(H(K+S))) from the user challenge data (K) and the intersection data (S). The first user hash data (e.g., user hash value H(H(K+S))) may comprise a hash value calculated from a third data component of the user challenge data (K) and the intersection data (S). In one implementation, the service provider device 180 may be adapted to store a first encryption value (K+S) related to the first user hash data in a memory component, wherein the first encryption value (K+S) comprises a third component of the user challenge data (K) and the intersection data (S).

In one aspect, the server application (e.g., service application 182 of service provider device 180) is adapted to compute the hash value H(H(K+S)). The Hash function comprises a cryptographically secure one-way message digest function like: SHA-2. Since H(H(K+S) is a Hash of a Hash, even less secure message digests like MD5 and SHA-1 may be used. In one example, Hash of Hash, itself, is a strong (secure) message digest function. In another example, the "+" operator connotes concatenation. The value computed in this step is K left concatenated to S and Hash of Hash of that value obtained.

Next, the service provider device 180 is adapted to receive user identity data (block 320). For example, the service provider device 180 is adapted to receiving second user hash data (e.g., user hash value H(H(K+S))) from the user 102 via the user device 120 over the network 160. The hash value H(H(K+S)) is calculated by the user interface application 122 from a third data component of the user challenge data (K) and the intersection data (S).

Next, the service provider device 180 is adapted to authenticate user identity (block 322) by, for example, comparing the user authentication data (i.e., the first user hash data H(H(K+S))) with the user identity data (i.e., the second user hash data H(H(K+S))) to authenticate user identity. In one aspect, comparing the first user hash data H(H(K+S)) with the second user hash data H(H(K+S)) to authenticate user identity may comprise determining if the first user hash data H(H(K+S)) matches the second user hash data H(H(K+S)). The service provider device 180 is adapted to compare the calculated hash value with the received hash value. If the two values match, then the web-client (e.g., user interface application 122) is authenticated. If the two values do not match, then an authentication error occurs, and the protocol may be aborted by the service provider device 180.

Next, if user identity is authenticated (block 324), then the service provider server 180 continues communicating with the user 102 via the user device 120 over the network 160 (block 326). Otherwise, if user identity is not authenticated (block 324), then the service provider server 180 aborts communicating with the user 102 via the user device 120 over the network 160 (block 328).

Figure 3B:
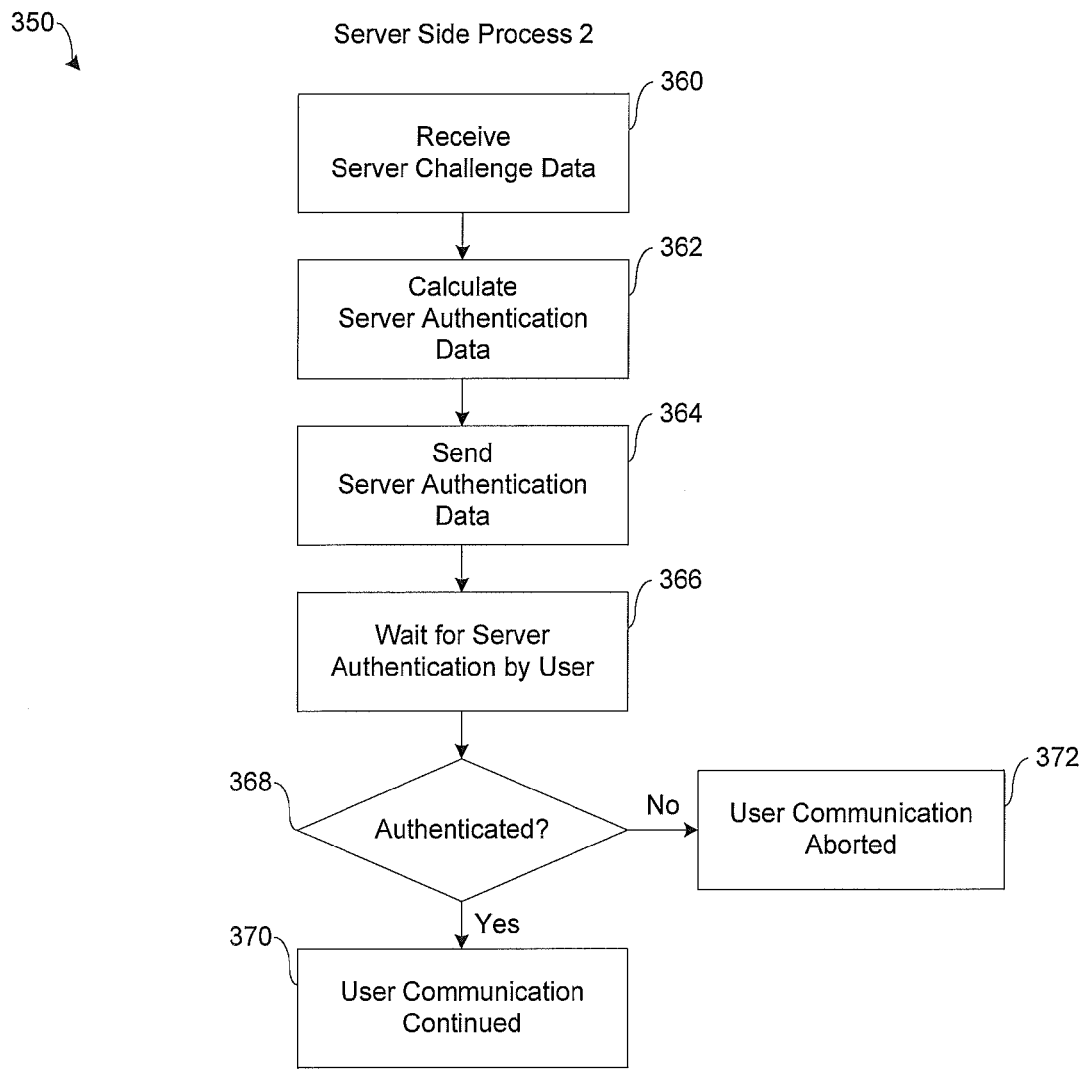

FIG. 3B shows one embodiment of a method 350 of another server-side process for facilitating network transactions over the network 160 including user identity verification, which may be included as part of the method 300 of FIG. 3A. For purposes of explanation, the method 350 of FIG. 3B is discussed in reference to FIG. 1 and FIG. 3A, but should not be limited thereto.

In one implementation, the service provider device 180 is adapted to receive server challenge data (L) from the user 102 via the user device 120 over the network 160 (block 360). The server challenge data (L) may comprise a random integer value (L) having 10 to 20 digits. In one aspect, the service provider device 180 is adapted to receive server challenge data (L) with the user identity data (i.e., the second user hash data, user hash value H(H(K+S))) from the user 102 via the user device 120 over the network 160, as described in reference to method 300 (block 320) of FIG. 3A.

In one aspect, the random integer value L of order of 10 to 20 digits may be selected by the web-client (e.g., user interface application 122). The random value L is selected to challenge the server application (e.g., service application 182) to authenticate itself. Since a new random value is used per authentication request, this may eliminate any replay of data by the server to the web-client. In one example, the value of L may be repeated across authentication protocols, as long as combination of R, T, K, and L is unique.

Next, the service provider device 180 is adapted to calculate server authentication data (block 364). For example, the service provider device 180 is adapted to calculate the server authentication data by calculating first server hash data (e.g., server hash value H(H(L+S+K))) from the server challenge data (L), the intersection data (S), and a third component of the user challenge data (K).

Next, the service provider device 180 is adapted to send the server authentication data to the user 102 (block 364). For example, the service provider device 180 is adapted to send the first server hash data (i.e., server hash value H(H(L+S+K))) to the user 102 via the user device 120 over the network 160. In one implementation, the service provider device 180 may be adapted to store a second encryption value (L+S+K) related to the first server hash data in a memory component, wherein the second encryption value (L+S+K) comprises the server challenge data (L), the intersection data (S), and the third component of the user challenge data (K).

In one aspect, the server application (e.g., service application 182 of service provider device 180) may be adapted to authenticate itself. As such, in one implementation, the server application may be adapted to compute H(H(L+S+K)) and return the computation to the web-client (e.g., user interface application 122) for validation. In one example, the random value L may be used in this context to make the hash unique for each authentication request.

In another aspect, the server application (e.g., service application 182 of service provider device 180) may store value L+K+S as a negotiated shared secret for subsequent encryption. In one example, the hash of value L+K+S may be used as a shared encryption key. As such, the value L+K+S may be used as a common, negotiated encryption key for subsequent data exchange between the web-client (e.g., user interface application 122) and the server application (e.g., service application 182).

Next, the service provider device 180 is adapted to wait for server authentication by the user 102 (block 366). For example, the user 102 is adapted to receive the first server hash data (i.e., server hash value H(H(L+S+K))) from the service provider device 180 via the user device 120 over the network 160. The user device 120 is adapted to calculate second server hash data (e.g., server hash value H(H(L+S+K))) from the server challenge data (L), the intersection data (S), and the third component of the user challenge data (K). Then, the user device 120 is adapted to compare the first server hash data H(H(L+S+K)) with the second server hash data H(H(L+S+K)) to authenticate server identity of itself.

In one aspect, the web-client (e.g., user interface application 122) receives the value H(H(L+S+K)) and computes an equivalent value. If the two values match, the server is authenticated. If not, an authentication error occurs, and the authentication protocol may be aborted.

Next, if server identity is authenticated (block 368), then the user 102 via the user device 120 continues communicating with the server over the network 160 (block 370). The user device 120 may send a message or alert to the service provider device 180 confirming the continued communication. Otherwise, if server identity is not authenticated (block 368), then the user 102 via the user device 120 aborts communicating with the server over the network 160 (block 372). The user device 120 may send a message or alert to the service provider device 180 confirming the aborted communication.

In accordance with embodiments of the present disclosure, the following discusses cryptographic analysis of the eZKPI algorithm including observations about security and cryptographic strength of eZKPI algorithm. All information exchange between web-client (e.g., user service application 122) and server application (e.g., service application 182) are sent over the network via plain Http. It may be assumed that an eavesdropper or a man-in-the-middle may be listening to the conversation. FIG. 2C shows what the eavesdropper may be able to capture. For example, as shown in FIG. 2C, the eavesdropper may only be able to capture a series of random numbers, plus some non-reversible hash values. The value for Consumer X is assumed to be publicly known, as is the case with many online electronic commerce (i.e., eCommerce) sites, or social networking sites, which readily list the name of their users along with their profiles, winning bids, etc.

No direct information about point P and Q is sent over the wire. In one aspect, this is in direct contrast to password authentication, wherein the password or its hashed value is always sent over the wire. No direct information about the intersection point S is sent over the wire. In one aspect, the intersection point value of S may be sent over in context of some non-reversible strong hash function. The use of hash of a hash creates a stronger hash function than the original hash function. For this reason, even a theoretically compromised hash function like MD5 or SHA-1 may be usable as a stronger version of SHA-2 256-bit.

In one aspect, the use of random values K and L in the protocol may reduce play-back by an eavesdropper or man-in-the-middle in either the client or server direction. The use of random values K and L in the protocol create the basis for a shared encryption key.

In another aspect, to calculate intersection point S, all four points P, Q, R, and T are needed. Since P and Q are never exchanged, it is not possible to calculate S without their knowledge. Even if P or Q was compromised, it would still not be possible for S to be computed from knowledge of only 3 points.

Thus, since the intersection point S is not possible to calculate without knowledge of shared secret points, the value L+K+S, or more importantly its Hash value is a strong session encryption key. When used as encryption key along side some algorithm like AES-256 with minimum 14 rounds of encryption, it results in a strong encryption of data content at comparable computation effort to that of Https.

In another aspect, the key space for the eZKPI algorithm is larger than password authentication with passwords of 6 characters or less. For example, approximately $2^{70}$ keys versus $2^{42}$ keys, respectively. Even when points P and Q are derived from a password or a pass-phrase, the length of the selected pass phrase, or password, is longer than 6 characters, which results in stronger and wider key space than typical web-base passwords.

In accordance with embodiments of the present disclosure, the eZKPI algorithm is adapted to avoid sending any information over the wire that may be intercepted and used by an eavesdropper or man-in-the-middle. For example, all data sent over the network may be assumed to have been captured by a man-in-the-middle with no consequence.

In accordance with embodiments of the present disclosure, the eZKPI algorithm is adapted to avoid the use of Https for the authentication process. In various aspects, all data is sent over Http and assumes that there is an eavesdropper or man-in-the-middle, and the session may be completely proxied. For example, no Https or use of X.509 certificates are utilized and only Http utilized throughout authentication protocol.

In accordance with embodiments of the present disclosure, the eZKPI algorithm provides comparable computational effort, if not less, for using this protocol versus sending a Hashed Password over Https session. Https setup is quite computationally expensive due to digital signature validation and certificate-chain validation of X.509 certificates. Also, each data transfer has to be encrypted to keep it protected. In one aspect, no encryption or certificate-chain validation may be needed in the eZKPI algorithm protocol.

In accordance with embodiments of the present disclosure, the eZKPI algorithm is adapted to substantially reduce or eliminate weak passwords and to have a wider key space in both the total possible keys. For example, one range is about $2^{70}$ keys or better. In one aspect, weak passwords are avoided, since all shared secret points are numbers that have no direct affinity to a child name, pet name, etc. At 12 digits for each shared secret logical point value, total of $10^{12}*10^{12}$ or roughly $2^{3^2}*2^{3^{12}}$ or about $2^{72}$ logical points are possible. This is much larger than the key space of 6 character passwords with roughly 70 characters in the mix (e.g., upper/lower alpha, plus digits, plus up to 8 punctuation characters, or 70^6 or roughly 2^7^6 or 2^42).

In accordance with embodiments of the present disclosure, the eZKPI algorithm is adapted to keep user-experience at the same level as password based authentication and keep computational aspects of password validation similar on client and server sides. In one aspect, user experience for the eZKPI algorithm is similar to password authentication, wherein the web-client (e.g., user service application 122) is asked to input either a pass phrase, a password, or a set of P and Q numbers. This may be all the user is prompted to input, and the remainder of the protocol may occur without further user involvement.

In accordance with embodiments of the present disclosure, the eZKPI algorithm is adapted to have strong, mutual authentication for the web-client (e.g., user service application 122) and server application (e.g., service application 182). In one aspect, each authentication request is considered unique in both directions given random values for T, R, K, and L. The eZKPI algorithm may be adapted to have a negotiated encryption key for subsequent encrypted data exchanges. The authentication process is highly secure, with zero knowledge about shared secrets leaking out.

In accordance with embodiments of the present disclosure, the eZKPI algorithm is adapted to substantially reduce or eliminate the possibility of dictionary attack, and substantially reduce or eliminate phishing attacks targeting capture of identification data, information and/or credentials. For example, to substantially reduce or eliminate phishing attacks, the eZKPI algorithm is adapted to convert one of the factors of shared secret on client side, say P, to something the user Has. The other factor remains as what the user Knows. Under this model, point P is encrypted with Hash of point Q value and stored on the local web-client (e.g., user service application 122) device. This prevents the phisher to use the value Q standalone, even if the phisher is able to capture value of Q. The phisher needs both values P and Q, but P is only recoverable from the device to which it is bound to (e.g., encrypted and stored thereto). For the phisher attack to be successful at recovering both P and Q, the phisher needs to be more sophisticated than the mere URL redirection that is used today for common password phishing attacks. As such, any such type of sophisticated attack has a reduced probability of success, which dramatically decreases the effectiveness and frequency of phishing attacks.

In another example, to substantially reduce or eliminate phishing attacks, the eZKPI algorithm is adapted to use secure ID cards or biometric devices. In one implementation, one of two secret points, such as point P, may be assumed to come from something the user Has (e.g., secure ID card, biometric fingerprint, etc.). The other point Q may be assumed to be something the user Knows (e.g., secure password, phrase, etc.). Thus, if the user is phished, only what the user Knows may be compromised, and what the user Has is not compromised. Similarly, if the device with which the user is invoking the web-client (e.g., user service application 122) is compromised, what the user Has is compromised, not what the user Knows. As such, the effectiveness of phishing is substantially reduced or eliminated.

In accordance with embodiments of the present disclosure, the eZKPI algorithm may be adapted to replace and modernize the web-client authentication process. The eZKPI algorithm may be adapted to substantially reduce or eliminate the use of Https for many of the client/server interactions, while providing strong mutual authentication between clients and servers. The eZKPI algorithm may be adapted to substantially reduce or eliminate phishing attacks for web-client password capture. The eZKPI algorithm may be adapted to operate along with other policy-based session management controls for a more secure mobile user experience (e.g., cell phone, laptop, tablet PC, etc.).

Figure 4:
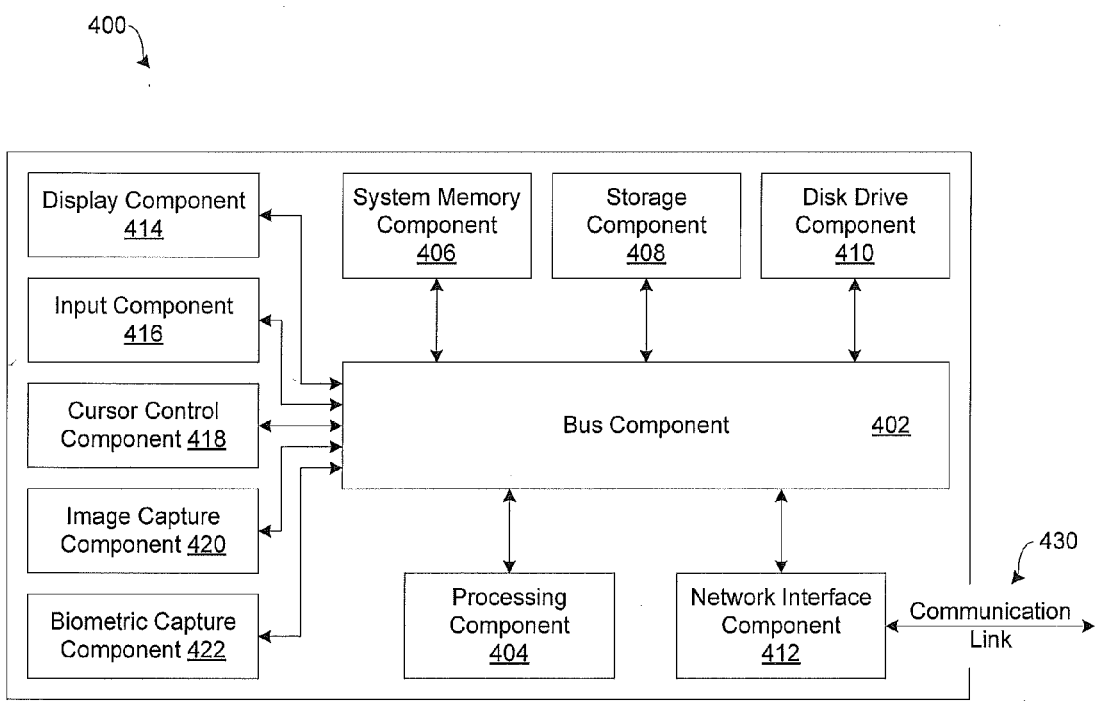
FIG. 4 is a block diagram of a computer system suitable for implementing one or more embodiments of the present disclosure.

FIG. 4 is a block diagram of a computer system 400 suitable for implementing one or more embodiments of the present disclosure, including the user device 120 and the service provider device 180. In various implementations, the user device 120 may comprise a mobile communication device (e.g., mobile cellular phone) capable of communicating with the network 160, and the service provider device 180 may comprise a network computing device, such as a network server. Hence, it should be appreciated that each of the devices 120, 180 may be implemented as computer system 400 in a manner as follows.

In accordance with various embodiments of the present disclosure, computer system 400, such as a mobile communication device and/or a network server, includes a bus 402 or other communication mechanism for communicating information, which interconnects subsystems and components, such as processing component 404 (e.g., processor, microcontroller, digital signal processor (DSP), etc.), system memory component 406 (e.g., RAM), static storage component 408 (e.g., ROM), disk drive component 410 (e.g., magnetic or optical), network interface component 412 (e.g., modem or Ethernet card), display component 414 (e.g., CRT or LCD), input component 416 (e.g., keyboard), cursor control component 418 (e.g., mouse or trackball), image capture component 420 (e.g., digital camera), and biometric capture component 422 (e.g., fingerprint reader, voice analyzer, retina scanner, palm reader, and/or facial recognition device).

In one implementation, disk drive component 410 may comprise a database having one or more disk drive components. In another implementation, user device 120 (e.g., mobile communication device, such as a cell phone) comprises biometric capture component 422 as to thereby promote higher confidence in verifying the identity of the user 102 accessing user device 120. As described herein, the biometric authentication schemes of the present disclosure utilize biometric identification data and information captured by biometric capture component 422 to validate user identity.

In accordance with embodiments of the present disclosure, computer system 400 performs specific operations by processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media and volatile media. In various implementations, non-volatile media includes optical or magnetic disks, such as disk drive component 410, and volatile media includes dynamic memory, such as system memory component 406. In one aspect, data and information related to execution instructions may be transmitted to computer system 400 via a transmission media, such as in the form of acoustic or light waves, including those generated during radio wave and infrared data communications. In various implementations, transmission media may include coaxial cables, copper wire, and fiber optics, including wires that comprise bus 402

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 430 (e.g., network 160 of FIG. 1, such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 430 and communication interface 412. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for facilitating user authentication by a server over a network, the method comprising:
communicating with a user via a user device over the network;
receiving an authentication request from the user via the user device over the network;
analyzing the authentication request to obtain user information, wherein the user information includes a username;
verifying that the server has a first and a second shared secret data related to the user, wherein a shared secrecy of the first and the second shared secret data is maintained between the user and the server, and wherein the first shared secret data includes biometric identification data related to the user stored in the user device and the second shared secret data includes data known by the user;
generating user challenge data;
sending the user challenge data to the user via the user device over the network;
defining one or more relationships between the first shared secret data, the second shared secret data, and the user challenge data;
determining intersection data for the one or more relationships;
calculating first user hash data from the user challenge data and the intersection data;
receiving second user hash data from the user via the user device over the network; and
comparing the first user hash data with the second user hash data to authenticate user identity, wherein if user identity is authenticated, then continue communicating with the user via the user device over the network, and wherein if user identity is not authenticated, then abort communicating with the user via the user device over the network.

2. The method of claim 1, wherein verifying that the server has the first and the second shared secret data of the user comprises:
locating a user account related to the user based on the user information passed with the authentication request; and
verifying that the user account has the first and the second shared secret data, wherein the first and the second shared secret data are received from the user via the user device over the network only during a registration process.

3. The method of claim 1, wherein: the first shared secret data is represented by a first integer value P, and the biometric identification data comprises at least one of fingerprint reader data, voice analyzer data, retina scanner data, palm reader data, and a facial recognition data.

4. The method of claim 1, wherein: the second shared secret data comprises user identification data selected by the user represented by a second integer value Q, and the user identification data comprises a password selected by the user.

5. The method of claim 1, wherein: the user challenge data comprises a plurality of data components including a plurality of different random integer values, a first data component comprises a first integer value T, a second data component comprises a second integer value R, and a third data component comprises a third integer value K, and each different random integer value comprises 10 to 20 digits.

6. The method of claim 1, wherein:
defining one or more relationships comprises defining a first line segment from the first shared secret data and a first data component of the user challenge data and defining a second line segment from the second shared secret data and a second data component of the user challenge data, the first line segment passes through point values for the first shared secret data and the first data component of the user challenge data, the second line segment passes through point values for the second shared secret data and the second data component of the user challenge data, and determining intersection data for the one or more relationships comprises determining an intersection point of the first and second line segments.

7. The method of claim 1, wherein:
the first user hash data comprises a hash value calculated from a third data component of the user challenge data and the intersection data,
receiving the second user hash data comprises receiving a hash value calculated by the user via the user device from a third data component of the user challenge data and the intersection data from the user via the user device over the network, and
comparing the first user hash data with the second user hash data to authenticate user identity comprises determining if the first user hash data matches the second user hash data.

8. The method of claim 1, further comprising:
receiving server challenge data with the second user hash data from the user via the user device over the network, wherein the server challenge data comprises a random integer value having 10 to 20 digits.

9. The method of claim 8, further comprising:
storing a first encryption value comprising a third component of the user challenge data and the intersection data; and
storing a second encryption value comprising the server challenge data, the intersection data, and the third component of the user challenge data, wherein the server challenge data comprises a random integer value having 10 to 20 digits.

10. The method of claim 8, further comprising:
calculating first server hash data from the server challenge data, the intersection data, and a third component of the user challenge data; and
sending the first server hash data to the user via the user device over the network;
so that the user via the user device over the network:
  receives the first server hash data;
    calculates second server hash data from the server challenge data, the intersection data, and the third component of the user challenge data;
    compares the first server hash data with the second server hash data to authenticate server identity of a server adapted to execute the method of claim 1;
    if server identity is authenticated, then the user via the user device continues communicating with the server; and
    if server identity is not authenticated, then the user via the user device aborts communicating with the server.

11. A system for facilitating user authentication over a network, the system comprising:
means for communicating with a user via a user device over the network;
means for receiving an authentication request from the user via the user device over the network;
means for analyzing the authentication request to obtain user information, wherein the user information includes a username;
means for verifying that the system has a first and a second shared secret data related to the user, wherein a shared secrecy of the first and the second shared secret data is maintained between the user and the server, and wherein the first shared secret data includes biometric identification data related to the user stored in the user device and the second shared secret data includes data known by the user;
means for generating user challenge data;
means for sending the user challenge data to the user via the user device over the network;
means for defining one or more relationships between the first shared secret data, the second shared secret data, and the user challenge data;
means for determining intersection data for the one or more relationships;
means for calculating first user hash data from the user challenge data and the intersection data;
means for receiving second user hash data from the user via the user device over the network; and
means for comparing the first user hash data with the second user hash data to authenticate user identity, wherein if user identity is authenticated, then continue communicating with the user via the user device over the network, and wherein if user identity is not authenticated, then abort communicating with the user via the user device over the network.

12. The system of claim 11, wherein means for verifying that the system has the first and the second shared secret data of the user comprises:
means for locating a user account related to the user based on the user information passed with the authentication request; and
means for verifying that the user account has the first and the second shared secret data, wherein the first and the second shared secret data are received from the user via the user device over the network only during a registration process.

13. The system of claim 11, wherein:
the first shared secret data is represented by a first integer value P,
the biometric identification data comprises at least one of fingerprint reader data, voice analyzer data, retina scanner data, palm reader data, and a facial recognition data,
the second shared secret data comprises user identification data selected by the user represented by a second integer value Q, and
the user identification data comprises a password selected by the user.

14. The system of claim 11, wherein:
the user challenge data comprises a plurality of data components including a plurality of different random integer values, a first data component comprises a first integer value T, a second data component comprises a second integer value R, and a third data component comprises a third integer value K, and each different random integer value comprises 10 to 20 digits.

15. The system of claim 11, wherein:
defining one or more relationships comprises defining a first line segment from the first shared secret data and a first data component of the user challenge data and defining a second line segment from the second shared secret data and a second data component of the user challenge data, the first line segment passes through point values for the first shared secret data and the first data component of the user challenge data, the second line segment passes through point values for the second shared secret data and the second data component of the user challenge data, and
determining intersection data for the one or more relationships comprises determining an intersection point of the first and second line segments.

16. The system of claim 11, wherein:
the first user hash data comprises a hash value calculated from a third data component of the user challenge data and the intersection data, receiving the second user hash data comprises receiving a hash value calculated by the user via the user device from a third data component of the user challenge data and the intersection data from the user via the user device over the network, and comparing the first user hash data with the second user hash data to authenticate user identity comprises determining if the first user hash data matches the second user hash data.

17. The system of claim 11, further comprising:

means for receiving server challenge data with the second user hash data from the user via the user device over the network, wherein the server challenge data comprises a random integer value having 10 to 20 digits.

18. The system of claim 17, further comprising:

means for storing a first encryption value comprising a third component of the user challenge data and the intersection data; and means for storing a second encryption value comprising the server challenge data, the intersection data, and the third component of the user challenge data, wherein the server challenge data comprises a random integer value having 10 to 20 digits.

19. The system of claim 17, further comprising:

means for calculating first server hash data from the server challenge data, the intersection data, and a third component of the user challenge data; and means for sending the first server hash data to the user via the user device over the network;

so that the user via the user device over the network:
   receives the first server hash data;
   calculates second server hash data from the server challenge data, the intersection data, and the third component of the user challenge data;
   compares the first server hash data with the second server hash data to authenticate server identity of a server adapted to communicate with the user device over the network;
   if server identity is authenticated, then the user via the user device continues communicating with the server; and
   if server identity is not authenticated, then the user via the user device aborts communicating with the server.

20. The system of claim 11, wherein: the system comprises a server adapted to communicate with the user device over the network, and the user device comprises a mobile communication device adapted to communicate with the server over the network.

21. A non-transitory computer readable medium on which are stored computer readable instructions and when executed by one or more processors of a server are operable to:
   communicate with a user via a user device over a network;
   receive an authentication request from the user via the user device over the network;
   analyze the authentication request to obtain user information, wherein the user information includes a username;
   verify that the server has a first and a second shared secret data related to the user, wherein a shared secrecy of the first and the second shared secret data is maintained between the user and the server, and wherein the first shared secret data includes biometric identification data related to the user stored in the user device and the second shared secret data includes data known by the user;
   generate user challenge data;
   send the user challenge data to the user via the user device over the network;
   define one or more relationships between the first shared secret data, the second shared secret data, and the user challenge data;
   determine intersection data for the one or more relationships;
   calculate first user hash data from the user challenge data and the intersection data;
   receive second user hash data from the user via the user device over the network; and
   compare the first user hash data with the second user hash data to authenticate user identity, wherein if user identity is authenticated, then continue communicating with the user via the user device over the network, and wherein if user identity is not authenticated, then abort communicating with the user via the user device over the network.

22. The computer readable medium of claim 21, wherein verifying that the server has the first and the second shared secret data of the user comprises:
   locating a user account related to the user based on the user information passed with the authentication request; and
   verifying that the user account has the first and the second shared secret data, wherein the first and the second shared secret data are received from the user via the user device over the network only during a registration process.

23. The computer readable medium of claim 21, wherein:
   the first shared secret data is represented by a first integer value P,
   the biometric identification data comprises at least one of fingerprint reader data, voice analyzer data, retina scanner data, palm reader data, and a facial recognition data,
   the second shared secret data comprises user identification data selected by the user represented by a second integer value Q, and
   the user identification data comprises a password selected by the user.

* * * * *